(12) United States Patent
Braunheim et al.

(10) Patent No.: US 6,231,698 B1
(45) Date of Patent: May 15, 2001

(54) SURFACE HARDENED SWAGE MOUNT FOR IMPROVED PERFORMANCE

(75) Inventors: Stephen Thomas Braunheim, Santa Barbara; Ernest Edward Swayney, Newberry Park, both of CA (US)

(73) Assignees: David A. Janes, Newport Beach; Stephen T. Braunheim, Santa Barbara, both of CA (US)

( * ) Notice: Subject to any disclaimer, the term of this patent is extended or adjusted under 35 U.S.C. 154(b) by 0 days.

(21) Appl. No.: 09/081,710

(22) Filed: May 19, 1998

(51) Int. Cl.[7] .................................................. C21D 1/56
(52) U.S. Cl. ............................................ 148/606; 148/637
(58) Field of Search .................................... 148/225, 578, 148/606, 637, 236; 360/103, 104, 105, 106

(56) References Cited

U.S. PATENT DOCUMENTS 5,344,502 * 9/1994 Mack et al. ........................... 148/236
5,591,277 * 1/1997 Braunheim ........................... 148/578
5,689,389 * 11/1997 Braunheim ........................... 360/104

OTHER PUBLICATIONS

Metals Handbook, Ninth edition, vol. 4 Heat Treating, pp135–147. Aug. 1982.*

* cited by examiner

Primary Examiner—Scott Kastler
(74) Attorney, Agent, or Firm—Mitchell, Silberberg & Knupp LLP

(57) ABSTRACT

A swage mount including a base plate having a first side and a second side. A hub extends from the first side of said base plate with the hub having an aperture therethrough. The second side of the base plate is mounted on either the actuator arm or the load beam so that the aperture of the hub is in registration with a swage opening disposed in the actuator arm or the load beam. The hub is inserted in the swage opening of the other of the actuator arm or load beam thereby forming an interference fit therebetween. The swage mount is surface hardened by gas carburizing, bead blasting or tumbling thereby increasing the torque retention value of the interference fit.

48 Claims, 1 Drawing Sheet

SURFACE HARDENED SWAGE MOUNT FOR IMPROVED PERFORMANCE

BACKGROUND OF THE INVENTION

Figure 1:
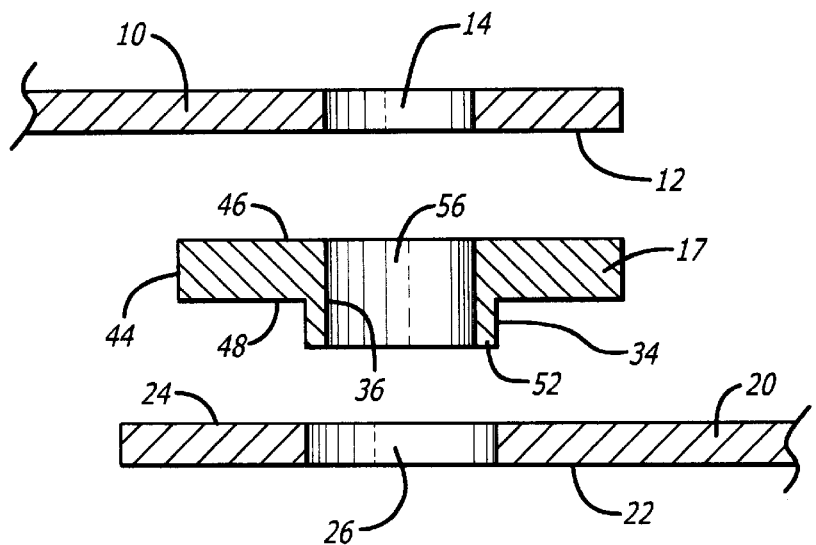

This invention relates to disc drive components and, more particularly, to improving the torque retention characteristics of a low profile swage mount fastener used for securing a load beam of a magnetic head suspension assembly to an actuator arm.

Disc drives are used in a variety of devices such as computers, facsimile machines, copiers and any other equipment where mass data storage is desired. Two important and costly sub assemblies in disc drives are a head suspension assembly (HSA) and a controller driven actuator assembly. Included in the HSA is a read/write head that is capable of reading digital information stored on platters in the disc drive. The HSA and actuator assembly function as a unit to precisely position the read/write head vertically adjacent a precise point on the disc drive platter, with the actuator arm directing the movement of the HSA across the face of the platter through control of an actuator arm connected to the HSA. Each sub-assembly includes precision made components manufactured to exacting standards that consequently increase the cost of such parts. Because of the complexity and cost involved in each sub-assembly, manufacturers have found that having the ability to disconnect and reconnect the HSA and actuator assembly substantially reduces costs should either assembly require rework or replacement.

To facilitate the cost effective repair and/or replacement of these assemblies, the HSA and actuator assembly are typically connected at a stacked joint defined by the distal end of the pivoting actuator arm and the proximal end of a thin elongated load beam. The opposite end of the load beam supports the read/write head that sweeps across the disc platter in response to an actuator controller. Satisfactory operation of the drive requires the read/write head to be selectively positioned vertically adjacent to selected microscopically compressed annular data tracks formed on the platter within response times on the order of milliseconds. Such response involves acceleration levels on the sweeping load beam of up to 40 Gs (gravities). Therefore, the fastener connecting the actuator arm to the load beam must have the capability to withstand considerable torque on the order of 5–10 inch-ounces or more.

Disc drive manufacturers continually endeavor to reduce the size of their disc drives to meet market demands for faster drive operating speed and increased storage capacity. To increase storage capacity, additional double-sided platters are vertically stacked with each platter having its own actuator assembly and HSA. However, adding platters to a disc drive has the undesirable effect of increasing the vertical profile of the drive. As a result, manufacturers have endeavored to miniaturize existing drive components.

One such method for reducing the overall drive size is to reduce the size of the stacked vertical joint connecting the HSA to the actuator assembly. For example, in U.S. Pat. No. 5,689,389 (Braunheim '389), the contents of which are incorporated herein by reference, a low profile swage mount fastener is used to connect the load beam of the HSA to the actuator arm of the actuator assembly. Because the swage mount fastener has a low profile, the overall height of the disc drive may be reduced, especially in drives using multiple platters and HSAs. However, a disadvantage of using a low profile swage mount fastener is that as performance demands increase, it provides less torque retention than is required to withstand the force levels imposed on the sweeping load beam.

In Braunheim '389, the torque retention characteristics of a low profile swage mount fastener were increased by modifying the internal geometry of the swage mount. However, the level of torque retention that can be achieved solely by modifying the swage mount design is limited. Without increased torque retention values, the acceleration rate a load beam can withstand is limited, which imposes an upper limit on the speed at which the read/write head can be positioned over a selected portion of the platter. This in turn will limit the overall access time a disc drive can achieve, a key parameter of disc drive performance. Accordingly, there is a shortcoming in the art in the unavailability of a low profile swage mount fastener capable of torque retention values that are significantly higher than have been previously achieved.

Moreover, when the load beam is accelerated to high speeds for positioning the read/write head to a particular location on the platter, the read/write head has a tendency to lift vertically away from the platter. If the head moves too far away from the platter, drive read/write operations are adversely effected. To minimize this affect, the HSA is "preloaded," that is, it is biased toward the platter. In preloading, the HSA is curved downwardly positioning the read/write head closer to the platter. Preloading thus creates a downward force on the head so that when the load beam is accelerated, this downward force restrains the head from lifting above a horizontal plane parallel to the platter. Generally, preloading of 3 to 4 grams of force is sufficient to achieve this result.

A present drawback in using a swage mount fastener to join the HSA to the actuator assembly is that the process of swaging causes "gram loss," i.e. it negates the beneficial effect of preloading. The effect swaging has on gram loss is measured by comparing the pre-swage gram load on the HSA versus the post-swage gram load. It has been found that an average gram loss distribution of about 0.1 to 0.3 grams occurs as a result of the swaging process. Accordingly, it would be desirable to provide a low profile swage mount fastener in which gram loss could be reduced while increasing torque retention values.

SUMMARY OF THE INVENTION

The present invention is directed at overcoming shortcomings of the prior art. The present invention provides a surface hardened swage mount, and a method of producing the same, and of hardening the metal from which such parts are made, and for connecting a disc drive actuator arm to a load beam, all in which an increased torque retention characteristic is obtained. In addition to the increased torque retention properties, the swage mount of the present invention also permits the achievement of improved less gram loss characteristics resulting from the swaging process.

The swage mount of the present invention includes a base plate having a first side and a second side. A hub extends from the first side of the base plate with the hub having an aperture therethrough. The second side of the base plate is mounted on either the actuator arm or the load beam so that the aperture of the hub is in registration with a swage opening disposed in the actuator arm or the load beam. The hub is inserted in the swage opening of the other of the actuator arm or load beam forming an interference fit therebetween. The swage amount may also be utilized to be swaged into the load beam and actuator, with the load beam sandwiched between the swage mount and the actuator arm. The swage mount is surface hardened during manufacture, thereby increasing the torque retention value of the interference fit. By increasing the torque retention characteristics of low profile swage mounts, increased drive access speeds can be achieved without increasing the disc drive profile. The surface hardening techniques disclosed herein also have broad applicability to metals and metallic components generally.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

DESCRIPTION OF THE DRAWING FIGURES

Figure 2:
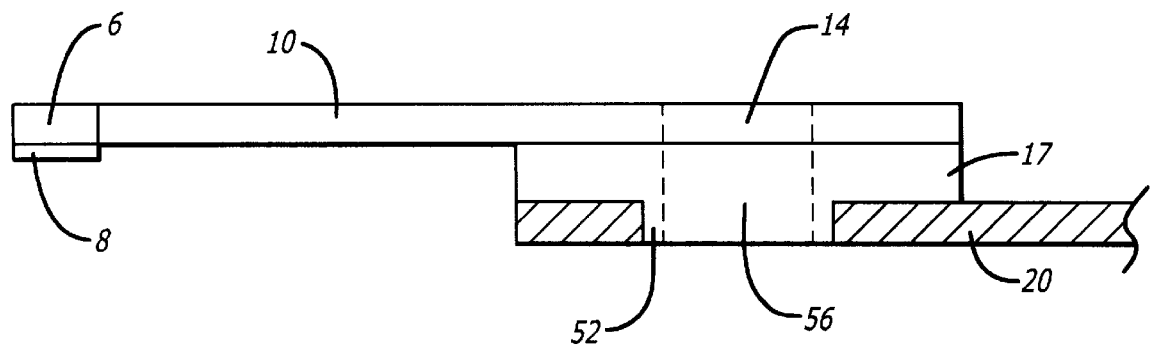

In the drawing figures, which are not to scale, and which are merely illustrative, and wherein like reference numerals depict like elements throughout several views:

FIG. 1 is an exploded partial horizontal sectional view of an actuator arm, load beam and swage mount of the present invention; and FIG. 2 is an enlarged partial horizontal sectional view of a load beam mounted to an actuator arm using the swage mount of the present invention.

DETAILED DESCRIPTION OF THE PREFERRED EMBODIMENTS

Referring now to FIGS. 1–2, there is shown a swage mount fastener constructed in accordance with the present invention. In a conventional disc drive, a load beam 10 includes a proximal end, generally rectangular in shape, that extends and tapers to a distal end. Suspended on the distal end of load beam 10 is a read/write head 8 connected to the load beam via a flexture 6. The proximal end of load beam 10 includes a planar attachment face 12 and a centrally formed swage opening 14 for allowing the passage of a swaging element during assembly of the disc drive, in a manner known in the art.

An actuator arm 20 is formed from a metal base 22, and includes a planar mounting surface 24 at its distal end. A swage opening 26 is formed centrally through mounting surface 24 for telescopically receiving a swage mount 17. Actuator arm 20 is typically mounted at its proximal end (not shown) to an actuator controller that sweeps actuator arm 20 through a predetermined angular path along a horizontal plane, in an art recognized manner. Swage mount 17 includes a horizontal base plate 44 having oppositely disposed first and second planar surfaces 46 and 48 for contacting planar attachment surface 12 of load beam 10 and mounting surface 24 of actuator arm 20, respectively. Base plate 44 may be formed in a variety of peripheral polygonal shapes, for example a rectangular shape, depending on the configuration of load beam 10 and actuator arm 20. Extending from second planar surface 48 of swage mount 17 is a cylindrical hub 52 having an aperture 56 formed therethrough. The cylindrical wall of aperture 56 within hub 52 defines an inner swaging surface 36, which is contacted by the swaging element during drive assembly, and an outer engagement surface 34, which contacts the inner cylindrical wall of swage opening 26 of actuator arm 20.

Swage mount 17 fastens load beam 10 to actuator arm 20 in the following manner. First planar surface 46 of base plate 44 is typically welded to planar attachment surface 12 of load beam 10 such that hub 52 projects outwardly from load beam 10 and such that aperture 56 aligns with swage opening 14 of load beam 10. Swage opening 26 of actuator arm 20 is then brought into longitudinal alignment with load beam 10 with swage opening 26 of actuator arm 20 closely fitted around hub 52 such that actuator arm 20, load beam 10 and swage mount 17 form a vertically stacked joint. Once proper alignment is obtained, a swaging element is inserted through swage opening 14 of load beam 10 and into aperture 56 of swage mount 17. Typically, the swaging element is spherical which, when inserted into aperture 56, exerts force on inner swaging surface 36 of hub 52. This force causes a radially outward displacement of hub 52 resulting in the plastic deformation of hub 52. This displacement causes outer engagement surface 34 of hub 52 to exert a radially outwardly compressive frictional force against the inner wall of swage opening 26 of actuator arm 20. As a result of this process, an interference fit is formed which bonds actuator arm 20 to swage mount 17 and also provides torque resistance for inhibiting the angular rotation of load beam 10 relative to actuator arm 20.

Similarly, swage mount 17 can be first welded to actuator arm 20 with hub 52 then engaging the swage opening of 14 of load beam 10.

Additionally, the swage mount 17 can be swaged through both the load beam 10 and the actuator arm 20, resulting in the load beam 10 being sandwiched between the swage mount 17 and the actuator arm 20. In accordance with the present invention, it has been found that significantly increased torque retention characteristics are achieved when the surface of swage mount 17 is hardened. As described above, increasing the torque retention properties of low profile swage mounts allows increased drive access speeds while maintaining a low drive profile. Also, in addition to increasing torque retention in this manner, the internal geometry of swage mount 17 can then be designed to substantially improve gram loss, as well as reducing the mass of the swage mount, since the hub can be shortened without sacrificing retention torque, resulting in reduced inertia of the part, and thus the assembly.

The processes by which swage mount 17 may be hardened in accordance with the present invention will now be described.

Swage mount 17 is typically constructed from 300 series stainless steel (SS) because of the corrosion resistant properties of that material. In a preferred embodiment, type 305 SS is used to form swage mount 17. After formation through stamping, however, the Vickers hardness (VH) of swage mount 17 increases to approximately 350–425 VH as result of the mechanical impact on the metal during stamping. A Vickers hardness in this range renders swage mount 17 vulnerable to cracking during the swaging process. To avoid this consequence, swage mount 17 is generally annealed after stamping to reduce its Vickers hardness to approximately 135 VH, a value that is suitable for swaging.

To achieve increased surface hardness while still retaining sufficient core softness of swage mount 17, it has been found that a specific heat treatment process may be utilized. Specifically, a carburizing gas is introduced into the furnace during the annealing process. Normally, the annealing of swage mount 17 is performed in a "humpback" furnace, such as for example the Hayes Continuous Belt Furnace sold by C.I. Hayes of Rhode Island under the product designation BAC-MH-02-03-18/AD150. The annealing process includes heating the oven to approximately 1850° F. and introducing approximately 35 cu. ft. of hydrogen gas into the a furnace. This will result in reducing the Vickers hardness of swage mount 17 to approximately 135 VH. To simultaneously harden the surface of swage mount 17 in accordance with the present invention, a carburizing atmosphere is created in the furnace by adding a carburizing gas, such as methane, into the furnace. During this gas carburizing process, the outer surface of swage mount 17 becomes impregnated with carbon atoms released by the carburizing gas, thereby making the surface of swage mount 17 harder while at the same time annealing the core of swage mount 17.

The process of hardening the surface of swage mount 17 while annealing its core will now be described in more detail. The part utilized in an exemplary process according to the present invention is a low profile swage mount sold by Intri-Plex Technologies (IPT) of Goleta, Calif., part number 15118-03. First, the furnace described above is heated to approximately 1850° F. Next, approximately 35 cu. ft. of hydrogen gas is introduced into the furnace, as well as approximately 0.3–0.5 cu. ft. of methane gas, with 0.4 cu. ft. of methane presently preferred. Swage mount 17 is placed on the furnace belt having a belt speed of approximately 4.5 inches per minute. Approximately 100 parts in a 3"×5",½" deep basket were passed through the oven. At this belt speed, swage mount 17 is in the "hot zone" of the furnace for approximately 7.33 minutes. Under these conditions, carbon is impregnated into swage mount 17 to a depth of approximately 0.0001" to 0.0003". This process yields a Vickers hardness on the surface of swage mount 17 of approximately 160–185 VH while also producing a core hardness of approximately 135 VH. Tests have shown that a Vickers hardness of 170–180 VH on the surface of swage mount 17 is preferred, and can yield improvements in torque retention values of such a swage mount by roughly 200–300% over the same swage mounts untreated with the inventive process herein described.

Thus, utilizing the above process, a swage mount having increased surfaced hardness is provided which results in increased of torque retention characteristics. At the same time, the core of swage mount 17 is softened by annealing thereby reducing the chance of swage mount 17 cracking during swaging, and so that swage forces do not become excessive. Also, because torque retention is significantly increased by increasing surface hardness, the internal geometry of swage mount 17 can then be designed to improve gram loss characteristics, and reduce mass.

The conditions described above for heat treating swage mount 17: i.e. furnace temperature, hydrogen gas to methane gas ratio and belt speed (heating time), may be varied to provide different Vickers hardness for both the surface and core of swage mount 17. For example, by increasing the content of methane gas introduced into the furnace, a deeper surface hardness having a higher Vickers hardness will result. Also, the temperature of the furnace can be raised to increase the depth of the surface hardness while at the same time further softening the core of swage mount 17. The furnace belt speed can also be reduced (heat time increased) to provide the beneficial results herein described. Finally, other gases, such as natural gas or propane, may be substituted for the methane gas in the gas carburizing process. Tests have shown that by adjusting the heat treatment parameters, the surface hardness of swage mount 17 can be increased to over 450 VH. Generally, however, those parameters will be selected to achieve the desired surface hardness and hardness depth to improve the torque retention value of swage mount 17 while still maintaining a core softness so that swage mount 17 does not crack during swaging. The person of skill will recognize that through routine experimentation, multiple combinations of surface hardness and core hardness can be achieved to suit the particular application specific design parameters that need to be addressed. The invention is not merely limited to the specific surface hardness parameters or hardening techniques disclosed, but rather the invention is directed to the recognition that a stainless steel (or other similar metal) part used in the construction of disk drive assemblies and/or other critical manufacturing applications may be processed to achieve increased torque retention values and also to permit improved gram loss characteristics of the resulting part by surface hardening of the part while retaining a desired core softness.

Although the heat treatment method described above for increasing the surface hardness of swage mount 17 is preferred, other methods that achieve increased torque retention value have been identified. For example, swage mount 17 can be subjected to a bead blasting process, known in the art, wherein glass beads are projected at swage mount 17 at a particular speed. The beating of the surface of swage mount 17 increases the surface hardness of the swage mount.

For example, a part to be surface hardened may be bead blasted in a manner known in the art, using, by way of non-limiting example, 0.002" diameter glass beads at an air pressure of 80 psi in a drum rotating at approximately 5–10 RPM for one to four minutes, with four minutes being preferred. The same IPT part number 15118-03 as mentioned above, annealed to a hardness of 135 VH, in a lot size of 5000, and blasted for four minutes, was hardened to a surface hardness value of approximately 151.8 VH.

Another method by which the surface hardness of swage mount 17 can be increased is called tumbling of shot peening. In tumbling, swage mount 17 in placed in a bucket loaded with small steel shots and the bucket is agitated and/or rotated. Like in the ball peening process, the mechanical beating of the surface of swage mount 17 increases the hardness of the swage mount surface.

For example, in a preferred tumbling process (shot peening), the same IPT part number 15118-03, annealed to a hardness of approximately 135 VH, is tumbled, in a lot size of 200,000 parts, in a Time Saver 120 type tumbler, available from Mass Finishing Inc. of Delano, Minn. The barrel of the tumbler is filled approximately half full with #S110 steel shot. No water or soap or other additive is included. The tumbler is set to rotate at about 90 RPM for approximately 90 minutes. Such a process has yielded parts having a surface hardness of approximately 149.8 VH.

For both mechanical hardening processes described above, the part is preferably annealed prior to hardening, to a hardness of approximately 135 VH, or other application specific core hardness value.

Of course the skilled practitioner will recognize that other methods of surface hardening the swage mount, or other part, may be employed without departing from the spirit and teaching of the present invention, provided the other methods produce the desired application specific surface hardness values, generally, as indicated, greater than 135 VH.

Accordingly, using the methods described above, a swage mount is provided having significantly increased surface hardness, thereby increasing the torque retention characteristics of the swage mount. Because the torque retention characteristics are increased by increasing surface hardness in accordance with the present invention, the internal geometry of swage mount 17 can then be modified to improve gram loss characteristics, and reduce the mass as well.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A method for providing an increased torque retention characteristic in a joint formed using a swage mount for connecting a disc drive actuator arm to a load beam, said actuator arm and said load beam formed with respective swage openings, said swage mount having a base plate having a first side and a second side, said first side having a hub extending therefrom, said hub having an aperture extending therethrough, said method comprising the steps of:

surface hardening said swage mount while maintaining a core softness for said swage mount;

mounting said base plate to one of said actuator arm or said load beam so that said aperture of said hub is in registration with said swage opening of said one of said actuator arm or said load beam;

inserting said hub into said swage opening of the other of said actuator arm or said load beam; and inserting a swaging element into said aperture thereby forming an interference fit between said swage mount and said other of said actuator arm or said load beam.

2. The method of claim 1, wherein the step of surface hardening said swage mount is performed by bead blasting.

3. The method of claim 1, wherein the step of surface hardening said swage mount is performed by tumbling.

4. The method of claim 1, wherein the step of surface hardening said swage mount is performed by gas carburizing.

5. The method of claim 4, further comprising the steps of:

heating a furnace to approximately 1850° F.;

adding approximately 35 cu. ft. of hydrogen to said furnace adding approximately 0.3–0.7 cu. ft. of methane to said furnace; and moving said swage mount through said furnace so that swage mount is exposed to said heat for approximately 7.33 minutes.

6. A method for improving torque retention characteristics of a swage mount, comprising the steps of:

hardening a surface of said swage mount to a first hardness value; and maintaining a core hardness of said swage mount at a second hardness value, wherein the first hardness value indicates a harder material than the second hardness value.

7. The method of claim 6, wherein said first hardness value is greater than 135 Vickers hardness.

8. The method of claim 6, wherein said first hardness value is in a range of 170–180 Vickers hardness.

9. The method of claim 7, wherein the second hardness value is approximately 135 Vickers hardness.

10. The method of claim 8, wherein the second hardness value is approximately 135 Vickers hardness.

11. A method of surface hardening a metal component, said method comprising the steps of:

heating a heating zone of a heat treatment oven to a treatment temperature;

filling said oven with a gas mixture comprising hydrogen gas and a carburizing gas, wherein the ratio of hydrogen gas to the carburizing gas is approximately 50–150:1; and passing said metal component through said heating zone for a time period during which said heating zone is heated to said treatment temperature and said oven is filled with said gas mixture.

12. The method of claim 11, wherein said treatment temperature is in a range of approximately 1500–2100 degrees Fahrenheit.

13. The method of claim 11, wherein said time period is approximately 3 to 12 minutes.

14. The method of claim 11, wherein said treatment temperature, said ratio of hydrogen gas to the carburizing gas and said time period are selected to achieve surface hardening to a depth of approximately 0.0001 inches to 0.0003 inches in said metal component.

15. The method of claim 14, wherein said depth is greater than 0.0003 inches.

16. The method of claim 1, wherein said swage mount is surface hardened to a Vickers hardness greater than 135.

17. The method of claim 1, wherein said swage mount has a surface and a core, and wherein said surface hardening step hardens the surface of said swage mount while simultaneously annealing the core of said swage mount.

18. The method of claim 1, wherein said swage mount has a surface and a core, and wherein said surface hardening step hardens the surface of said swage mount to a depth of approximately 0.0001 inch to 0.0003 inch.

19. The method of claim 1, wherein said surface hardening step is performed in a heated furnace.

20. The method of claim 19, wherein said swage mount has a surface and a core, and wherein said surface hardening step hardens the surface of said swage mount to a depth of approximately 0.0001 inch to 0.0003 inch.

21. The method of claim 19, wherein said swage mount has a surface and a core, and wherein altering parameters of said surface hardening step alters the depth and hardness of the surface of said swage mount.

22. The method of claim 21, wherein altering any of a gas ratio, a heating time and a furnace temperature alters at least one of the depth and hardness of the surface of said swage mount.

23. The method of claim 21, wherein the parameters of said surface hardening step are selected to achieve a desired surface hardness and hardness depth to improve a torque retention value of said swage mount while still maintaining a core softness so that said swage mount does not crack during swaging.

24. The method of claim 1, wherein said swage mount has a surface and a core, and wherein a desired core softness is retained during said surface hardening step.

25. The method of claim 1, wherein said swage mount is comprised of 300 series stainless steel.

26. The method of claim 6, wherein said swage mount has a surface and a core, and wherein the surface of said swage mount is hardened while simultaneously annealing the core of said swage mount.

27. The method of claim 6, wherein upon completion of said hardening step the first hardness value extends to a depth of approximately 0.0001 inch to 0.0003 inch.

28. The method of claim 6, wherein said hardening step is performed in a heated furnace.

29. The method of claim 28, wherein said swage mount has a surface and a core, and wherein upon completion of said hardening step the first hardness value extends to a depth of approximately 0.0001 inch to 0.0003 inch.

30. The method of claim 28, wherein said swage mount has a surface and a core, and wherein altering parameters of said hardening step alters the depth and hardness of the surface of said swage mount.

31. The method of claim 30, wherein altering any of a gas ratio, a heating time and a furnace temperature alters at least one of the depth and hardness of the surface of said swage mount.

32. The method of claim 30, wherein the parameters of said hardening step are selected to achieve a desired surface hardness and hardness depth to improve a torque retention value of said swage mount while still maintaining a core softness so that said swage mount does not crack during swaging.

33. The method of claim 6, wherein said hardening step and said maintaining step are simultaneously performed by carburizing said swage mount.

34. The method of claim 6, wherein the first hardness value is at least 20 hardness Vickers greater than the second hardness value.

35. The method of claim 6, wherein said swage mount is comprised of 300 series stainless steel.

36. The method of claim 11, wherein said metal component is comprised of stainless steel.

37. The method of claim 11, wherein said carburizing gas comprises methane gas.

38. The method of claim 11, wherein said metal component is for use in swage mounting.

39. The method of claim 11, wherein said metal component is a swage mount for use in a disc drive actuator arm assembly.

40. A method of surface hardening a metal component, said method comprising the steps of:

heating a heating zone of a heat treatment oven to a treatment temperature;

filling said oven with a gas mixture comprising hydrogen gas and a carburizing gas;

passing said metal component through said heating zone for a time period of approximately 3 to 12 minutes during which said heating zone is heated to said treatment temperature and said oven is filled with said gas mixture; and removing said metal component from said heating zone after said time period.

41. The method of claim 40, wherein said metal component is comprised of 300 series stainless steel.

42. The method of claim 40, wherein said carburizing gas comprises methane gas.

43. The method of claim 40, wherein said metal component is for use in swage mounting.

44. The method of claim 40, wherein said metal component is a swage mount for use in a disc drive actuator arm assembly.

45. The method of claim 44, wherein the ratio of hydrogen gas to the carburizing gas is approximately 50–150:1.

46. The method of claim 40, wherein said treatment temperature is in a range of approximately 1500–2100 degrees Fahrenheit.

47. The method of claim 40, wherein said treatment temperature, the ratio of hydrogen gas to the carburizing gas and said time period are selected to achieve surface hardening to a depth of approximately 0.0001 inches to 0.0003 inches in said metal component.

48. The method of claim 47, wherein said depth is greater than 0.0003 inches.

* * * * *